United States Patent [19]
Savage et al.

[11] Patent Number: 6,110,376
[45] Date of Patent: Aug. 29, 2000

[54] USE OF REVERSE OSMOSIS MEMBRANES TO TREAT EVAPORATOR CLEAN CONDENSATE

[75] Inventors: Peter Savage; Farshad Piroozmand, both of Saint John, Canada

[73] Assignee: J. D. Irving, Limited, Saint John, Canada

[21] Appl. No.: 09/210,711

[22] Filed: Dec. 14, 1998

Related U.S. Application Data

[60] Provisional application No. 60/074,140, Feb. 9, 1998.
[51] Int. Cl.$^7$ ................................................... B01D 61/00
[52] U.S. Cl. .......................................... 210/652; 210/652
[58] Field of Search ..................................... 210/651, 652, 210/195.2, 257.2, 805, 641, 770, 639, 774; 162/29

[56] References Cited

U.S. PATENT DOCUMENTS

| | | |
|---|---|---|
| 4,155,804 | 5/1979 | Edge, Jr. . |
| 4,155,845 | 5/1979 | Ancelle et al. ............................. 162/16 |
| 4,255,255 | 3/1981 | Ogawa et al. ............................. 210/652 |
| 5,174,901 | 12/1992 | Smith . |
| 5,290,454 | 3/1994 | Dorica et al. ............................. 210/928 |
| 5,470,481 | 11/1995 | Modell et al. ............................. 210/652 |
| 5,520,816 | 5/1996 | Kuepper ............................. 210/257.2 |

FOREIGN PATENT DOCUMENTS

| | | |
|---|---|---|
| 0 235 081 A1 | of 0000 | European Pat. Off. . |
| 44 13 304 A1 | of 0000 | Germany . |

*Primary Examiner*—Ana Fortuna
*Attorney, Agent, or Firm*—McFadden, Fincham

[57] ABSTRACT

A method and apparatus for the treatment of the 5th Effect combined evaporator condensate generated by kraft process pulp mills. The method includes the removal from effluents of organic compounds that result in BOD, COD and toxicity by the use of reverse osmosis. Through the use of a reverse osmosis membrane system there is provided a simple, economical and efficient treatment process for clean evaporator condensate, and in particular the 5th Effect combined evaporator condensate.

22 Claims, 13 Drawing Sheets

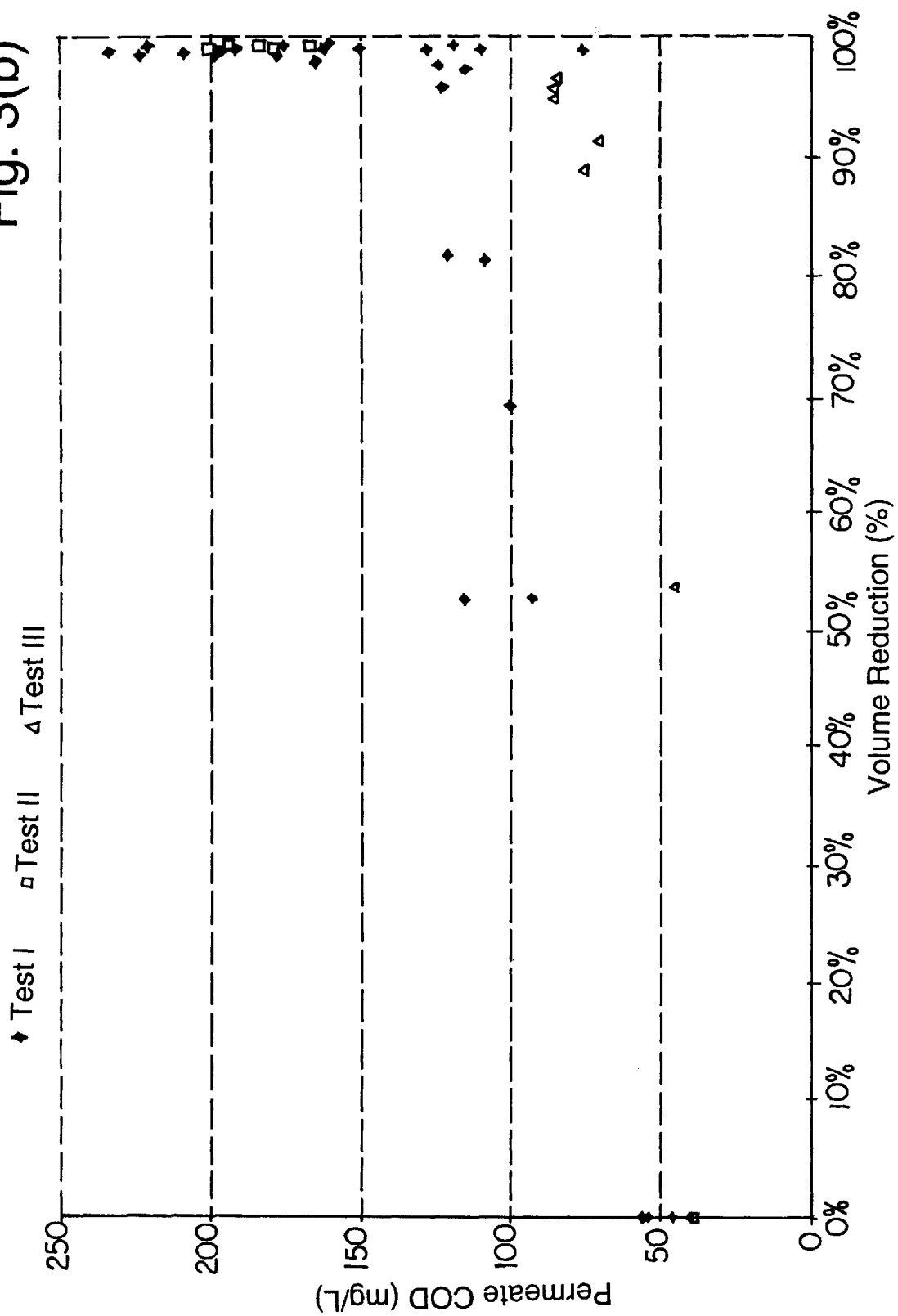

USE OF REVERSE OSMOSIS MEMBRANES TO TREAT EVAPORATOR CLEAN CONDENSATE

This application claims the benefit under 35 U.S.C. Section 119(e) of provisional application 60/074,140 filed on Feb. 9, 1998.

TECHNICAL FIELD

The present invention relates to a method and apparatus for the treatment of wastes generated by pulp mills. In particular, it relates to treatment of evaporator condensate combined No. 5 wastes generated by kraft process pulp mills, through the use of reverse osmosis membranes.

BACKGROUND OF THE INVENTION

In the pulp and paper industry, pulp and paper mils have had in the recent past to focus on alternative treatments for reducing mill effluent, and consequently there has been significant interest and activity to move towards "mill effluent closure" or a minimum impact mill environmentally. Pulp and paper mills are actively pursuing technologies to reduce waste water effluent loadings of compounds resulting in BOD and COD as well as various organic and toxic compounds.

A prerequisite to moving towards "mill closure" is to adequately treat evaporator condensate before it can be reused in the Fiberline displacing hot water. The treated condensate should preferably be low in BOD, COD, toxicity and organic compounds so that these are not carried through to the Bleach Plant effluent.

The most common methods used to treat evaporator condensate are biological treatment and stream stripping.

At present, in the pulp and paper industry, membrane technology has been applied to mill effluent. It has not been proposed, however, to use reverse osmosis techniques for removal of undesired components from condensates. In this regard, U.S. Pat. Nos. 5,470,481 and 4,155,845 show methods and apparatuses for treatment of paper mill effluent. In greater detail, U.S. Pat. No. 5,470,481 shows a method and apparatus for recovering wash water from pulp and more particularly the method includes filtering the effluent to form a filtrate stream and an organic solids feed stream. The solids-containing stream is heated and pressurized to a super-critical state causing the stream to oxidize and form steam when cooled. This process results in a gaseous component, inorganic solids component and a liquid wash component. This system includes a reactor and separating means to recover the wash water. U.S. Pat. No. 4,155,845 relates to ultrafiltration of effluents, and particularly of soda-containing effluent. This method includes the addition of a flocculating chemical agent or agents to the pulp mill effluent followed by an ultrafiltration of the pre-treated effluent. The ultrafiltration steps are conducted under a differential pressure while maintaining a linear speed of the pre-treated effluent.

Accordingly, there exists a need to reduce the deficiencies of the prior art processes directed towards the treatment of the clean evaporator condensate and to provide a simple, economical and efficient treatment process for clean evaporator condensate, and particularly, combined 5th effect combined clean evaporator condensate. It has been found that combined evaporator condensate No. 5 when cooled to about 40° C. may be passed through one and preferably two stages of reverse osmosis ("RO") membranes. This procedure removes a substantial portion of contaminants from the condensate, including contaminants resulting in BOD, COD, and toxins and organic compounds.

SUMMARY OF THE INVENTION

Thus, one object of this invention is to provide a method and apparatus for operation within the environment of a kraft process pulp mill for the treatment of effluent generated by the mill. Another object of the present invention is to provide a simple, economical and industrially efficient process for the treatment of kraft pulp mill effluent. More specifically, the invention provides a method for treating the 5th effect combined evaporator condensate ("condensate no.5"). This method includes the use of a reverse osmosis membrane system to treat the particular waste stream. This condensate contains primarily higher molecular weight organic compounds which are effectively removed by the reverse osmosis membrane system. This system results in a treated condensate low in BOD, COD, toxicity as well as in organic compounds that are possible endocrine disruptors for fish.

The treated condensate produced by the method of the present invention can then be reused in the Fiberline or other suitable component within the plant such that the bleach plant effluent will show no significant increase in BOD, COD or toxicity. The concentrated reject stream from the RO system, containing the organic compounds, can be incinerated in a recovery furnace or waste fuel ("bark") boiler. Alternatively, the stream can be fed to the liquor feed of the recovery boiler.

In contrast to the prior art methods, the method of the present invention using a reverse osmosis membrane system is able to overcome the problem of volume recovery. It has been found through pilot plant analysis that about a 99% volume recovery of condensate may be made, while still reducing contaminant levels significantly. Further, the present invention uses a reverse osmosis membrane system which enables the near complete removal of higher molecular weight organic compounds. In addition, the present invention focuses on treatment for no. 5 clean evaporator condensate to reduce the BOD, COD and toxicity which subsequently reduces the BOD, COD and toxicity of bleach plant and final mill effluent when the treated condensate is recycled.

The use of a reverse osmosis membrane system according to the present invention to treat evaporator condensate offers several advantages over biological treatment and steam stripping prior art techniques. These advantages include:

higher BOD and COD removal, of up to about 90%;

near complete removal of higher molecular weight organic compounds including those that could result in endocrine disruption to fish;

lower operating costs, particularly in energy consumption, as treated condensate can be reused displacing hot water; and the organic contaminants are concentrated in the low flow reject stream enabling it to be incinerated, for destruction of the contaminants.

In accordance with the above objects, the invention comprises in one aspect a method of treating condensate resulting from a pulp mill operation to obtain a first stream containing reduced contaminant levels capable of recycle and a second stream containing concentrated contaminant levels capable of being incinerated, comprising the steps of:

providing a source of liquid condensate containing contaminants from a pulp operation;

passing the liquid through a first reverse osmosis membrane in a separate said condensate into first and second liquid streams, said first stream containing concentrated contaminants and the second stream containing reduced contaminant levels;

recycling the second liquid stream within the pulp mill;

passing the first liquid stream through a second reverse osmosis membrane to separate the first liquid stream into two liquid streams, one of which contains final stage concentrated contaminants capable of being incinerated and the other of which contains reduced contaminant levels and which is then recycled.

The first stage separation is preferably carried out using a membrane for reduction of said contaminants by at least 80% thereby providing a liquid stream containing less than 20% of the original contaminants of the original liquid condensate this stream being recyclable within the mill.

The volume reduction resulting from the process is such that the final waste stream contains 2% or less of the volume of the original liquid condensate this final waste stream being very suitable for incineration.

Preferably, the method includes the additional step of passing said liquid condensate through at least one filter prior to said first separation stage.

Preferably, the first separation stage comprises dividing said liquid condensate into at least two streams and passing said at least two streams through reverse osmosis membranes arranged in parallel.

The method may comprise the further step of cleaning the reverse osmosis membranes on a periodic basis, said cleaning step comprising treatment of said membranes with a caustic detergent solution.

The first step separation stage preferably comprises removing higher molecular weight organic compounds by said membrane to reduce the amounts of higher molecular weight organic compounds within said condensate by at least approx. 80%.

In a further aspect, an apparatus is provided for treating condensate from a pulp mill operation to obtain a first stream containing reduced contaminant levels and a second stream containing concentrated contaminant levels capable of being incinerated, comprising:

intake means for intake of liquid condensate containing contaminants from a pulp mill operation;

pump means for pumping the liquid through the apparatus;

first and second stage reverse osmosis units, each unit comprising a plurality of pressure vessels or housings, with at least one reverse osmosis membrane within each housing. The reverse osmosis unit may conveniently comprise tubular housing, with the optional use of spiral wound membranes within the housing. The reverse osmosis membrane has a structure suitable for substantially preventing the passage of higher molecular weight organic compounds therethrough, while permitting the passage of water therethrough. Separate outlets from the housing are for outflow of purified condensate and for waste-bearing concentrate.

There may be further provided at least one further RO unit operating in parallel with the first RO unit, for simultaneous first stage treatment of the condensate.

The stream bearing the concentrated wastes is conveyed to a second reverse osmosis stage of the same general description, for a second stage waste concentration.

Pump means is used to circulate condensate through the apparatus.

Valve means and control means are provided. The control means includes control valve means and pump means to maintain a pressure within the reverse osmosis units of between 300 and 800 psig.

The $5^{th}$ Effect evaporator condensate usually is characterized as being a combined condensate.

The present invention, having being characterized in general terms, will be further described by reference to specific examples.

BRIEF DESCRIPTION OF THE DRAWINGS

FIGS. 3(a)–(e) are graphs showing COD removal as a function of volume reduction of the condensate in three separate pilot plant tests;

DETAILED DESCRIPTION OF THE PREFERRED EMBODIMENT

The present invention comprises a method and related apparatus for operation within the environment of a conventional kraft process pulp mill. The method is characterized by the use of reverse osmosis membrane installations for substantially removing the waste products from within clean evaporator condensate, in particular the 5th effect combined clean evaporator condensate. The resulting discharge from the apparatus, after application of the method described herein, comprises two streams, namely a stream comprising essentially purified water and a stream containing highly concentrated wastes. The 5th effect combined clean evaporator condensate, for illustrative purposes, has a flow rate of approximately 1100 USGPM and contains about 70% of the total evaporator clean condensate flow and BOD. The reverse osmosis membrane system of the present invention will generally provide 80–90% BOD/COD removal, as well as a high volume recovery (approximately 99%) for the treated condensate.

Thus, 90% of the organic contaminants will be concentrated into only 11 USGPM or 1% of the feed flow. This allows the return of the contaminant-rich reject stream to a black liquor recovery cycle for subsequent incineration in a recovery furnace. The treated condensate will preferably be recycled within the plant, by directing the flow to the Fiberline. In this stage, the purified liquid is used as repulper dilution at the last washer stage just ahead of the Bleach Plant.

The reverse osmosis membrane treatment system comprises 2 stages. The primary stage provides a 90% volume recovery which concentrates the condensate stream from 1100 USGPM to 110 USGPM. The secondary or reject stage further reduces the reject stream to 11 USGPM providing an overall 99% volume recovery.

To protect the reverse osmosis membrane, the condensate is cooled (preferably to 40° C.) and then filtered with a 5 micron cartridge filter or any other suitably sized filter. High pressure pumps will supply the condensate up to 650 psig to the primary stage and up to 800 psig to the reject stage. Conveniently, the system is operated within a pressure range of about 300–800 psig., with a preferred pressure at both stages being about 400 psig.

In one embodiment, the primary stage contains at least 2 banks, each of which has 18 pressure vessels in a 10/6/2 array. The reject stage has at least 1 band of pressure vessels in a 3/2/1 array. Each pressure vessel has 5 spiral wound TFC elements.

Figure 1:
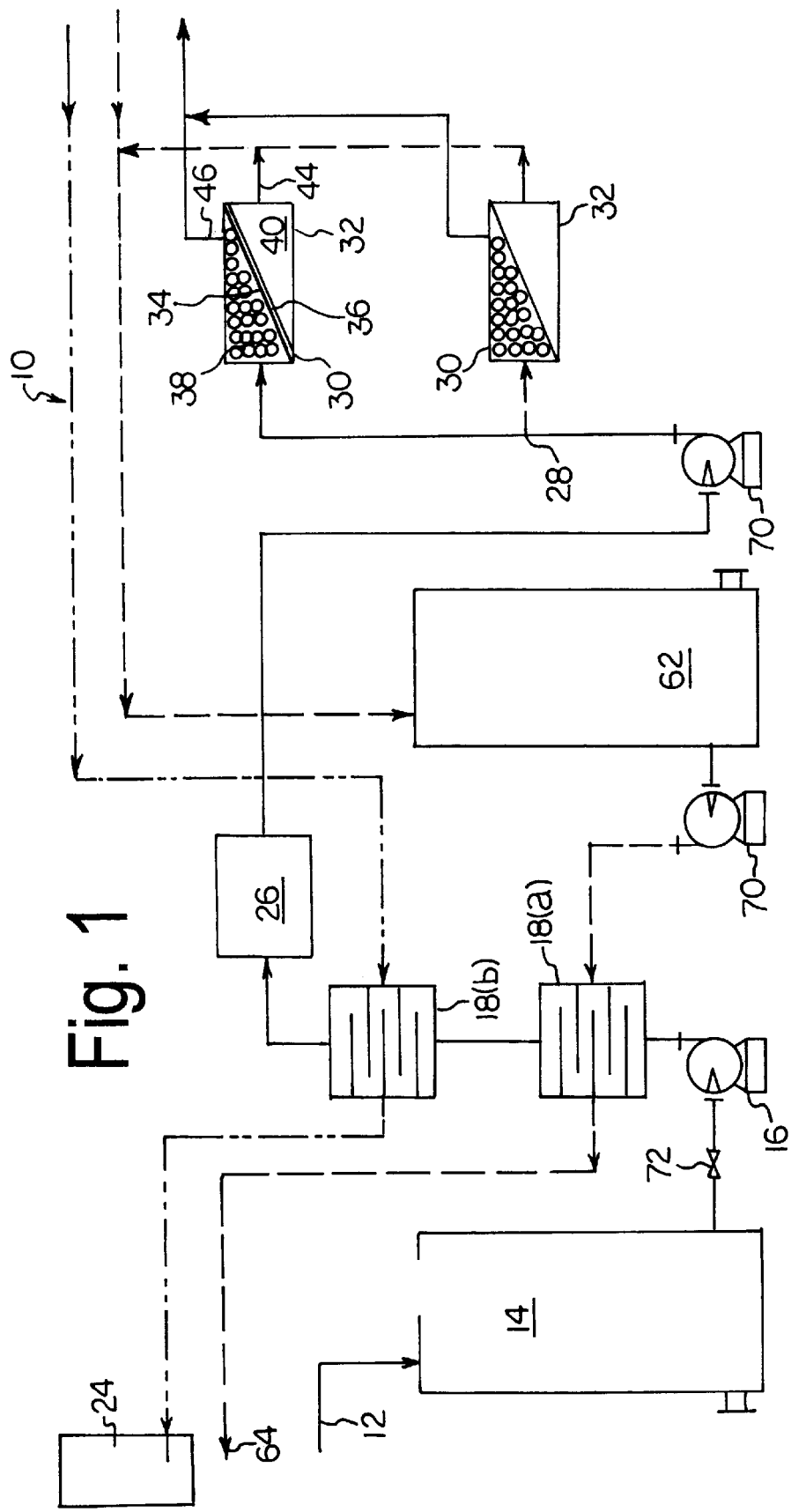
FIG. 1 is a block diagram showing a first stage of the method according to the present invention.
Figure 2:
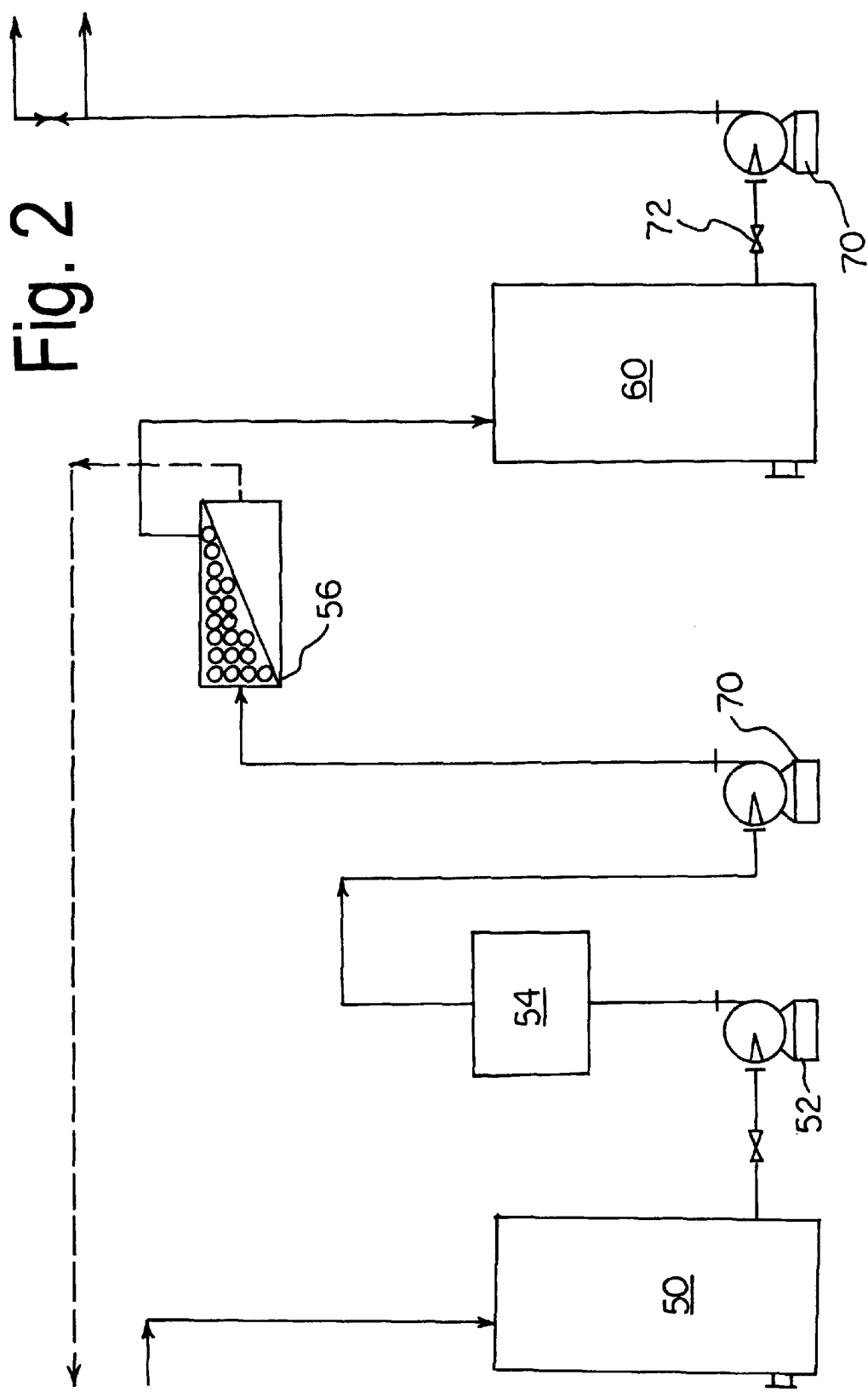
FIG. 2 is a block diagram showing a second stage of the method.
Figure 3A:
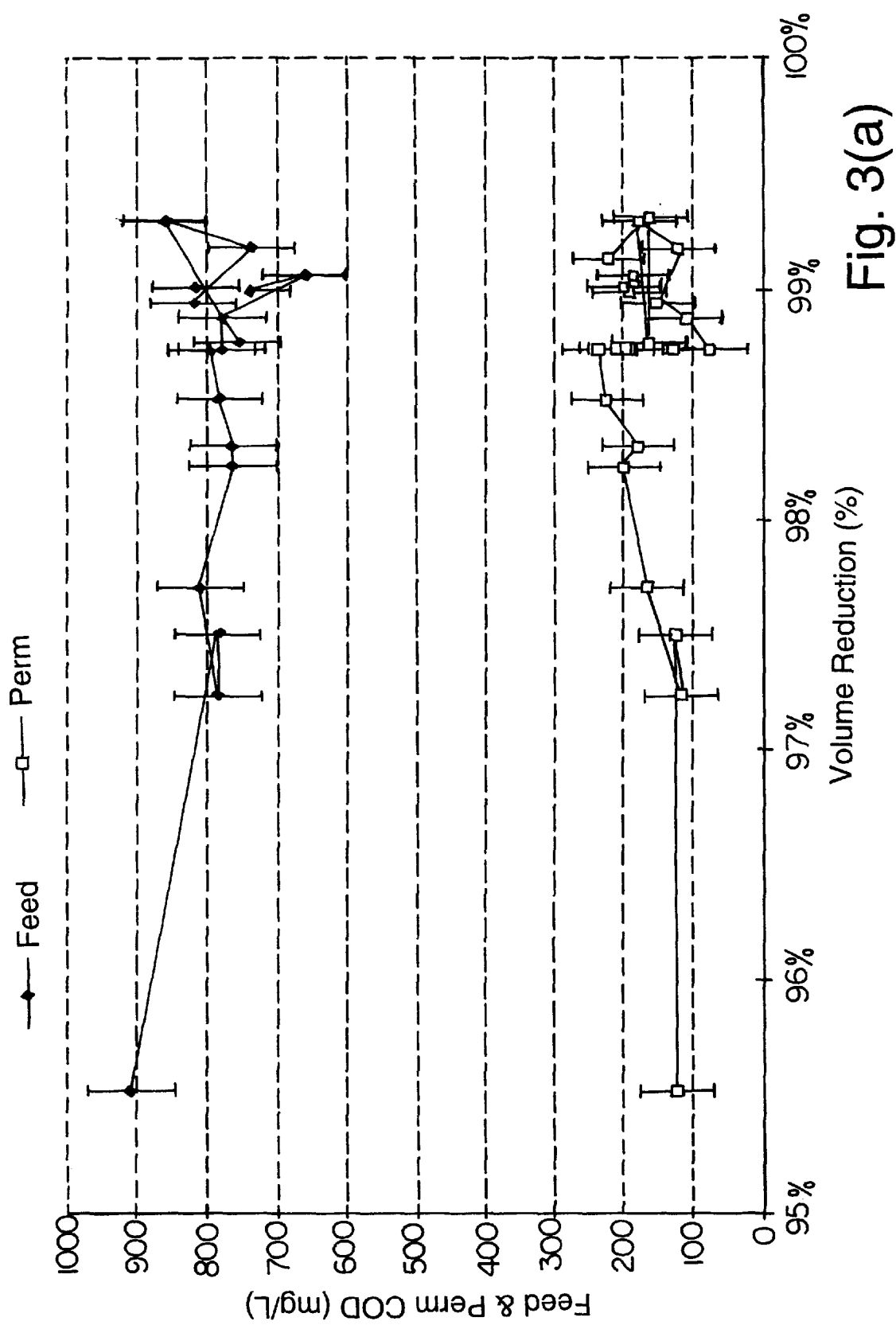
Figure 3C:
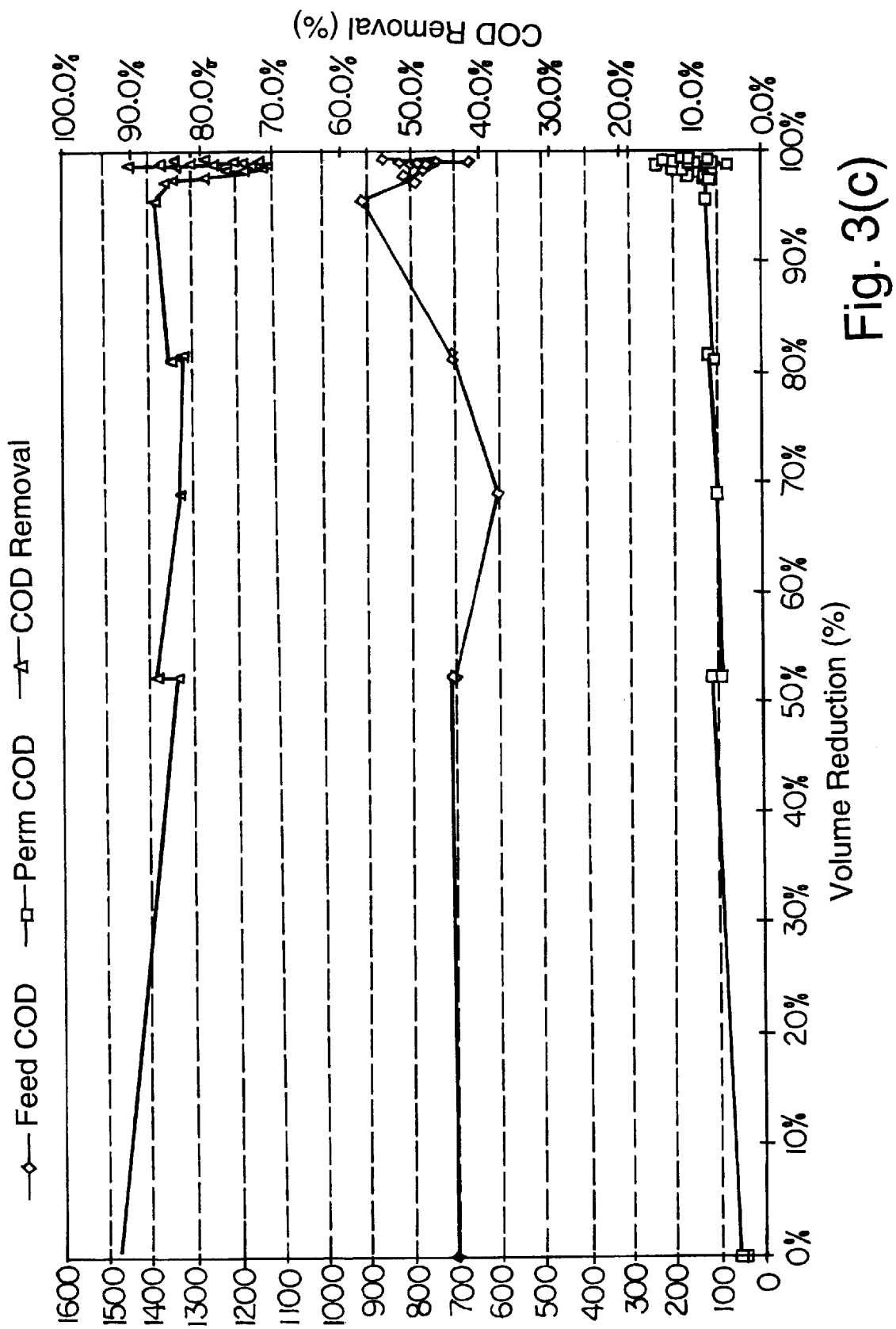
Figure 3D:
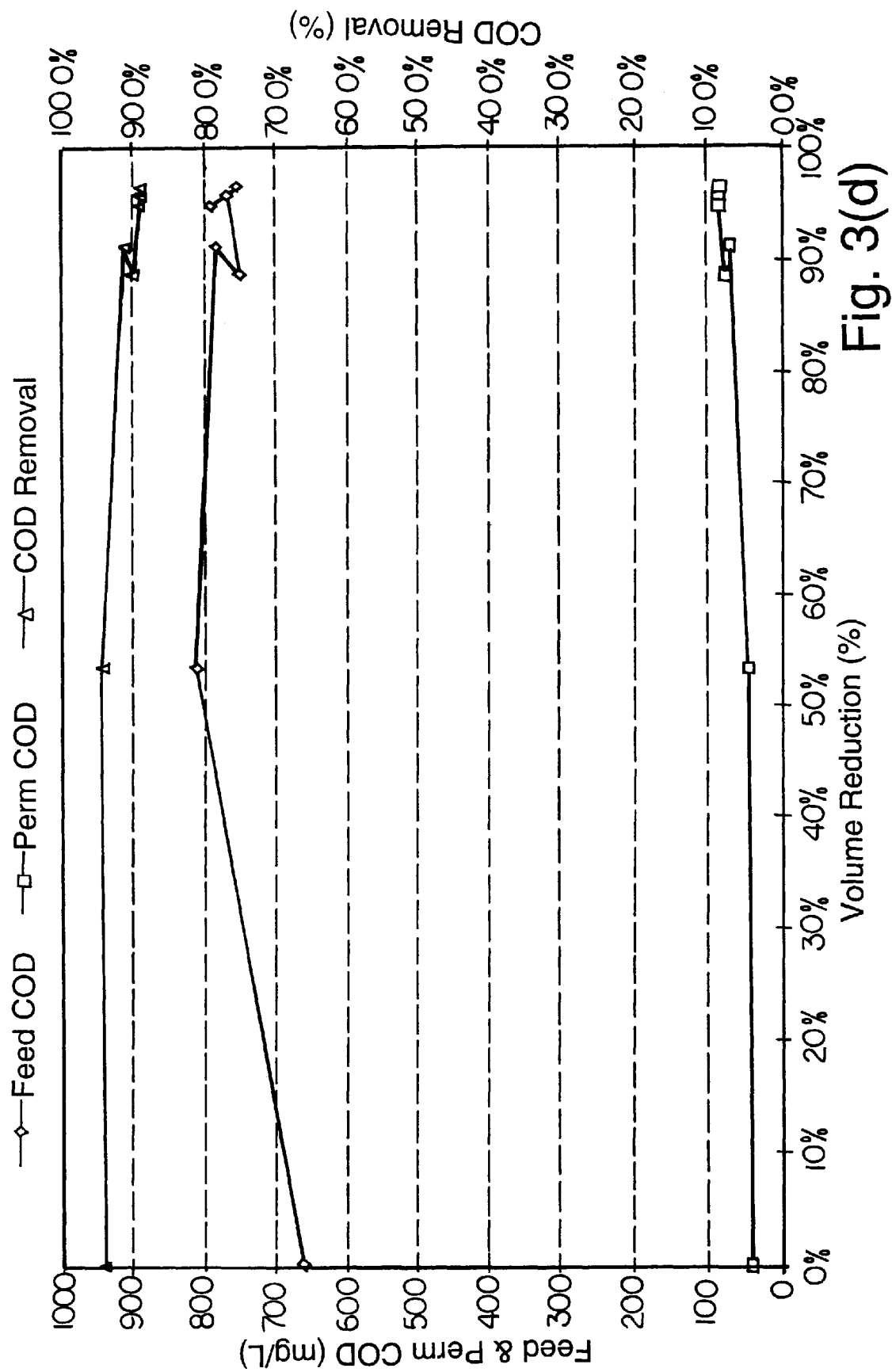
Figure 3E:
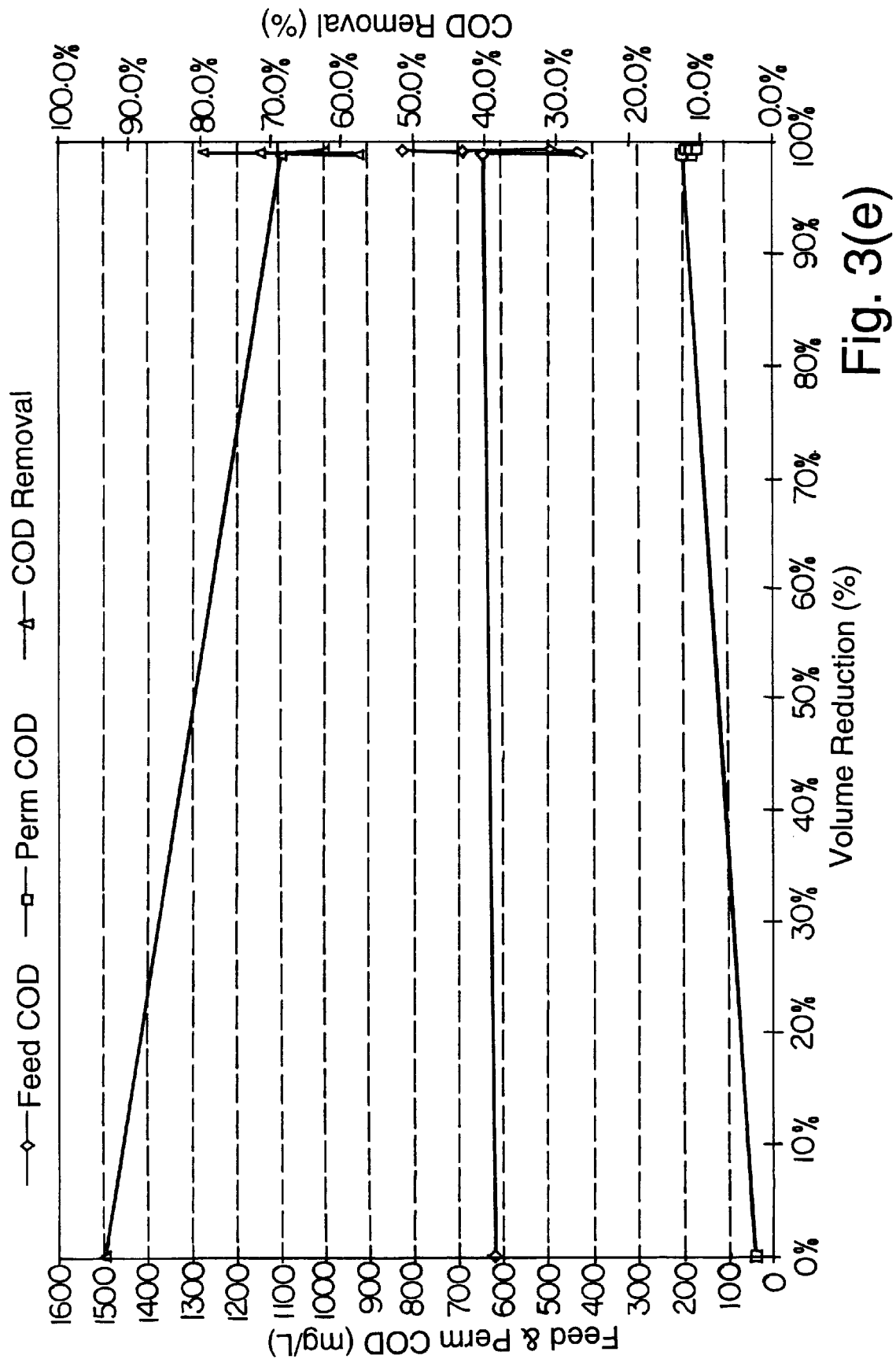

Referring to FIGS. 1 and 2, apparatus is shown for carrying out the present method. Raw untreated condensate No. 5 enters the apparatus 10 at inlet 12 and initially enters a holding tank 14. A feed pump 16 pumps the liquid from the holding tank through a pair of heat exchangers 18(*a*) and (*b*) arranged in series, for reduction of the condensate temperature from the approx. 80° C. intake temperature to about 40° C. suitable for reverse osmosis membranes. A first of the heat exchangers 18(*a*) derives its exchange medium from the outlet of the apparatus. The second heat exchanger 18(*b*) derives its heat exchange liquid from a raw water source which, after passing through the heat exchanger enters a warm water tank 24 for cooling to ambient temperature. The condensate then passes through an array of cartridge type 5 micron filters 26, following which the liquid enters a bank 28 of RO units for concentration of wastes within the liquid stream. The RO bank comprises two separate RO arrays arranged in parallel with each other for parallel processing of the condensate. Within the units, impurities are concentrated on the intake side of the membrane and purified water is concentrated on the outlet side.

Alternatively, the system may be designed to process lower levels of waste flows, with the first stage RO treatment comprising only a single RO unit.

Figure 8:
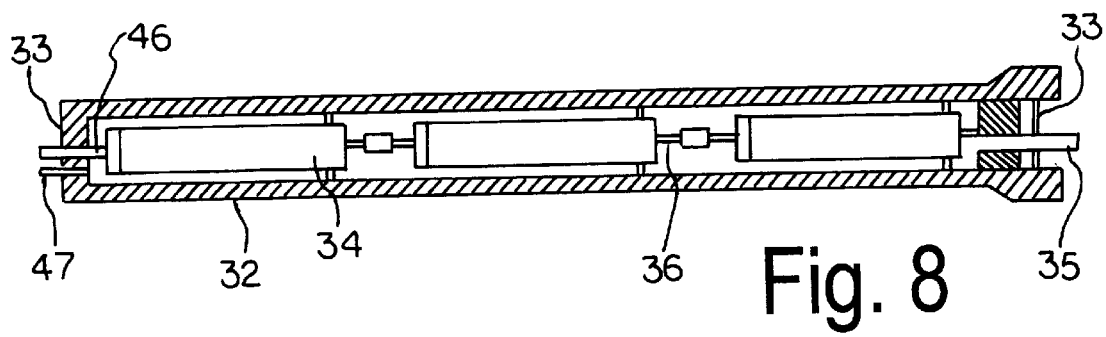
FIG. 8 is a sectional view of a reverse osmosis housing portion of the apparatus.
Figure 9:
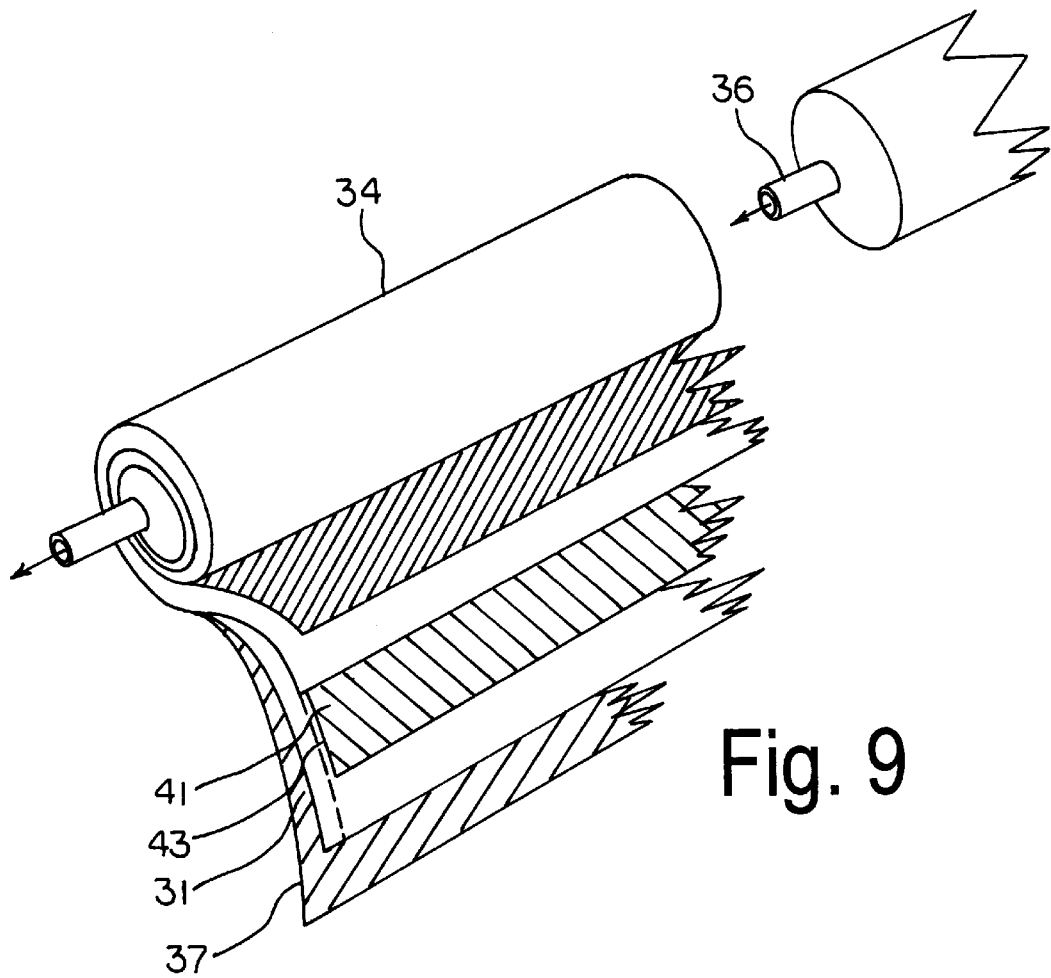
FIG. 9 is a sectional view of a reverse osmosis membrane or element.

As seen in FIGS. 8 and 9 as an example, each RO unit 30 comprises a tubular pressure vessel or housing 32, sealed by bulkheads 33 at either end. The vessel houses at least one and preferably multiple spiral-wound RO membrane 34. The membrane may comprise a thin film composite membrane, characterized by an ultrathin barrier layer 31 with approximately 150 angstrom diameter pores. The barrier layer is supported by a polyester support web 41, with a microporous polysulfone interlayer 43. A channel spacer 37 provides an intermembrane space on either side of the RO membrane to permit liquid to flow through the structure. The carrier water passes from the first side to the second side of the membrane, leaving behind the concentrated wastes. An RO element as characterized herein is sold commercially as under the trademark "Fluid Systems TFC Magnum". The unit operates on the principle of crossflow membrane filtration, whereby feed liquid is conveyed to the vessel under pressure (300–800 psi) through an inlet 35 at a first end of the vessel and flows lengthwise through the vessel between the membrane sheets. The composite membrane sheet structure is wound about a perforated hollow central core 36. The resulting structure provides alternate layers for the passage of permeate and feed liquid. The permeate flows within a generally spiral path as it passes through and past the membranes, inwardly towards the core 36. At the core, the purified permeate is under relatively low pressure (30 psi), and flows through the core to exit the RO unit through a first outlet 46. The feed liquid flows in a generally axial path lengthwise through the vessel, between the membrane layers. As the feed liquid flows past the membrane layers, the relative concentration of wastes increases. The liquid bearing concentrated wasters exits the vessel through a second outlet 47 adjacent the second end of the vessel.

Multiple RO elements 34 may be provided in an elongate axially-aligned array within the vessel 32, with a common or interconnected core 36 and feed liquid flowing axially from an inlet end of the array to an outlet end.

Within the housing, the transmembrane pressure is preferably about 400 psig and the permeate flux ranges from 15–235 gfd for the primary stage 5–15 gfd for the reject stage.

The purified water output of each of the RO units merges with the output from the second stage subsystem, which will be described in detail below, for discharge from the system.

The concentrated waste portion of the liquid after exiting the vessel through the outlet 47 then enters a second stage feed tank 50. The effluent is then driven by a feed pump 52 through a second set of cartridge filters 54 and subsequently through a second stage reverse osmosis unit 56 having the same features as the first stage RO units. The fully concentrated effluent is removed from the RO unit 56 to a concentrate tank 60, and subsequently pumped to the HSC black liquor evaporator, then to the recovery furnace or to the waste fuel boiler for eventual incineration. Alternatively, the concentrated effluent may be fed to the liquor feed of the recovery boiler. The purified water removed from the chamber joins with the first stage purified water and enters a permeate tank 62. The water is then pumped through the first heat exchanger 18(*a*) and serves to remove heat from the incoming effluent. The purified water then exits the apparatus through an outlet 64 for recycling within the plant. Conveniently, the purified effluent may be piped to the Fiberline.

Figure 10:
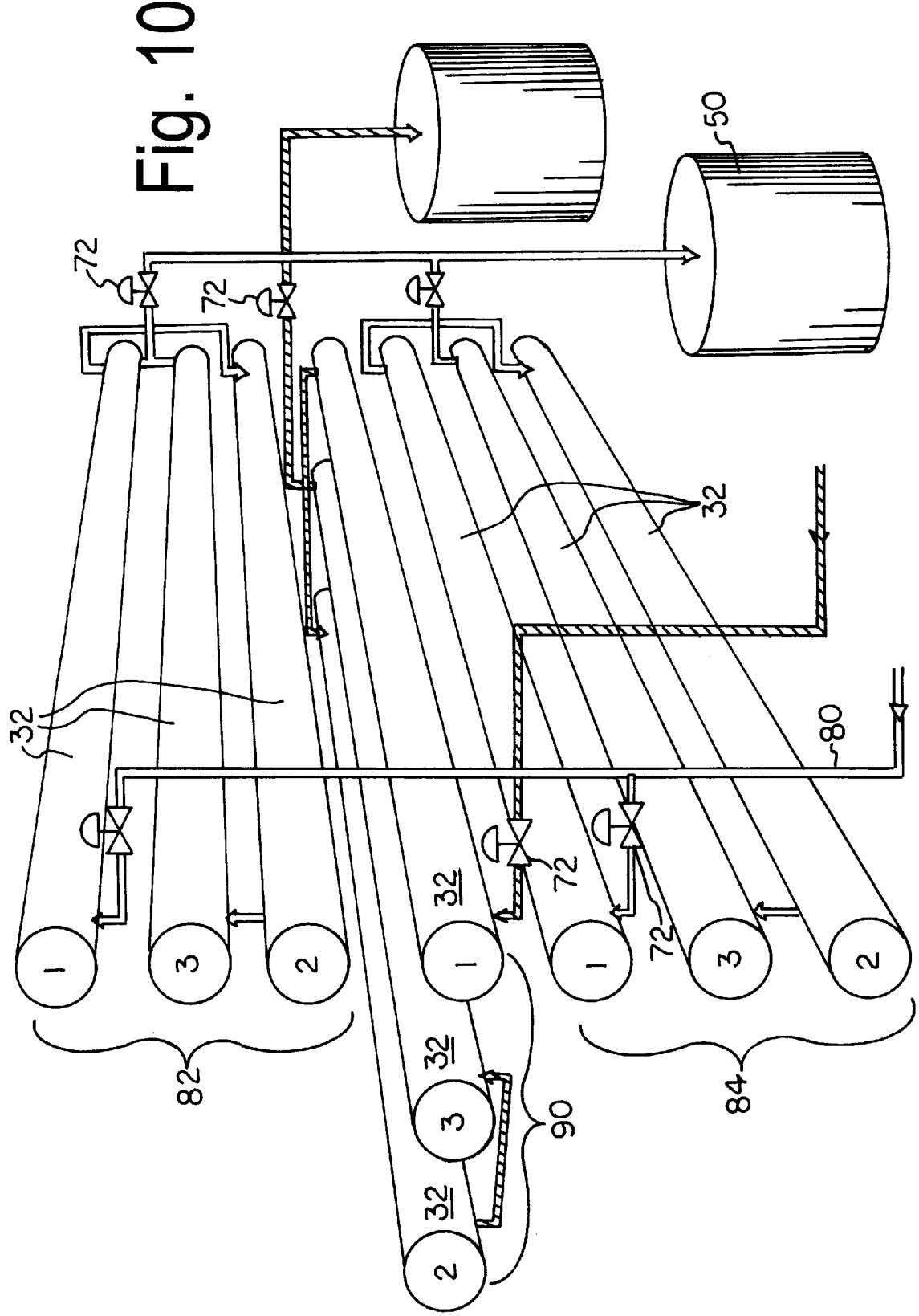
FIG. 10 is an illustration of 9 reverse osmosis apparatus, for use with the invention, featuring multiple pressure vessels and flow paths.

FIG. 10 illustrates a typical RO system. Conduit 80 pipes raw condensate into a first RO bank 82 for first stage processing of the liquid. A portion of the raw condensate is diverted into a second bank 84 for processing in parallel with the first bank. Each of the two primary banks comprise three separate pressure vessel arrays connected end to end, for serial treatment of the wastes. The stream bearing concentrated wastes flows into the second stage feed tank 50, from which it is then piped into the second stage bank 90 of RO vessels for the second stage processing. The second stage comprises a single bank of three pressure vessel arrays arranged in series. The first and second stage may be all retained within a single support frame, not shown. Each primary bank contains 3 arrays arranged in a 10/6/2 configuration. The second stage bank also has 3 arrays but in a 3/2/1 configuration.

The raw condensate, purified liquid and waste-beaning concentrate are all transported through the apparatus to the various components by piping, indicated as arrows in the illustrations. Flow rates and pressures are controlled and maintained by an array of pumps 70 and valves 72, positioned as required within the apparatus. A central control means controls the operation of the system components.

The condensate pH at which the process is carried out is important. Preferably, the pH of the condensate is adjusted to between 9.5 and 10.4 and preferably has a value of approximately 10. The pH of the condensate stream is adjusted to both increase the membrane rejection rate (i.e., increase the level of waste removal) and to reduce the rate of fouling of the membrane.

Figure 4:
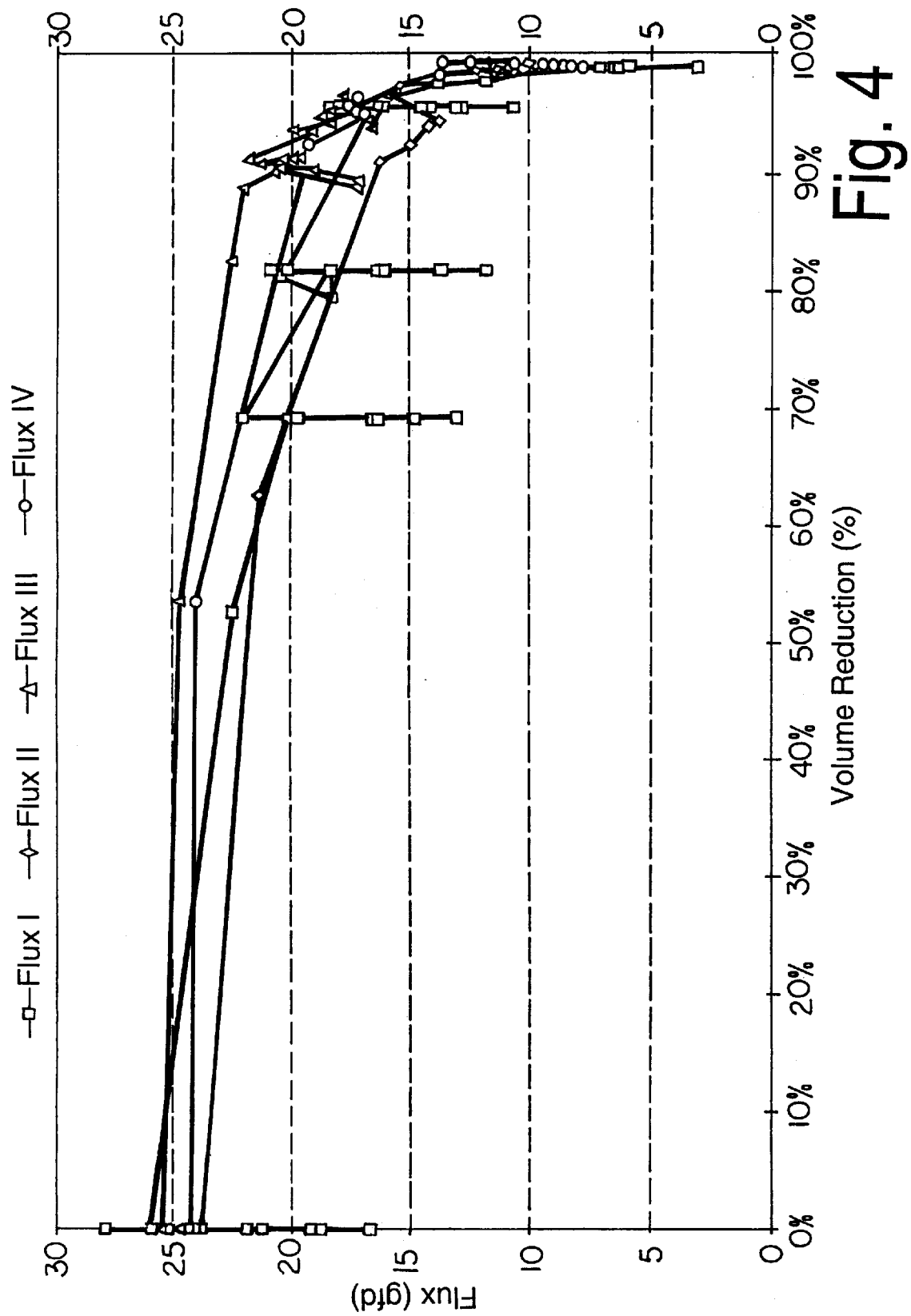
FIG. 4 is a graph showing the flux rate as a function of volume reduction of the condensate.

Membrane flux (as measured in gfd) is a function of the volume reduction experienced with the RO unit. As seen in FIG. 4, membrane flux remains relatively constant as a volume reduction increases, until about a 90% reduction level is achieved, when the flux decreases dramatically. Accordingly, the use of two sets of RO stages arranged in series permits a 99% volume reduction on the contaminant side of the membrane.

Figure 5:
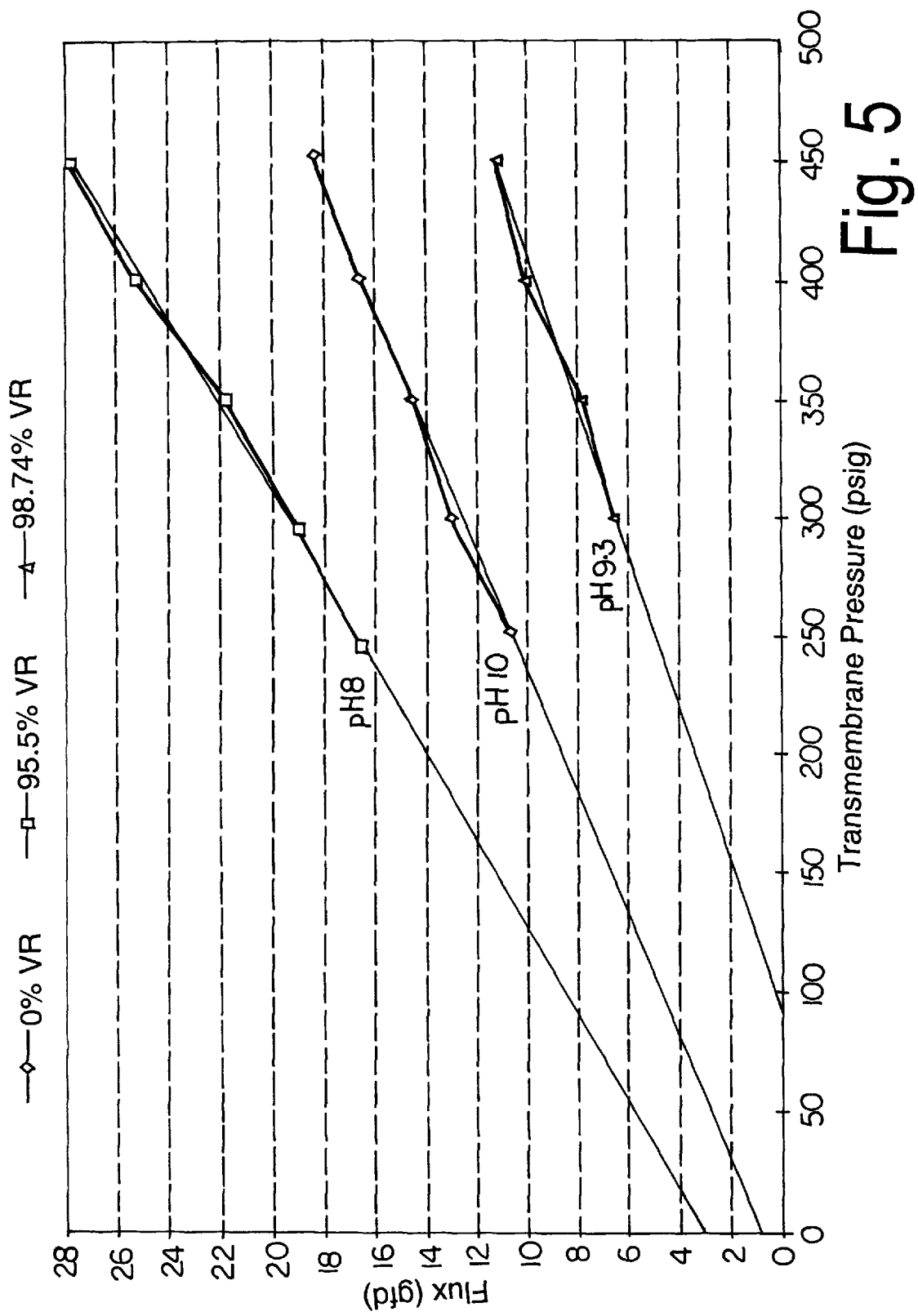
FIG. 5 is a graph showing the flux rate as a function of the transmembrane pressure and pH.

The flux rate is also a function of the transmembrane pressure. As the transmembrane pressure increases, the membrane productivity also increases. However, the productivity increase is less pronounced at higher recovery rates. FIG. 5 illustrates the flux rate as a function of the transmembrane pressure.

Figure 6:
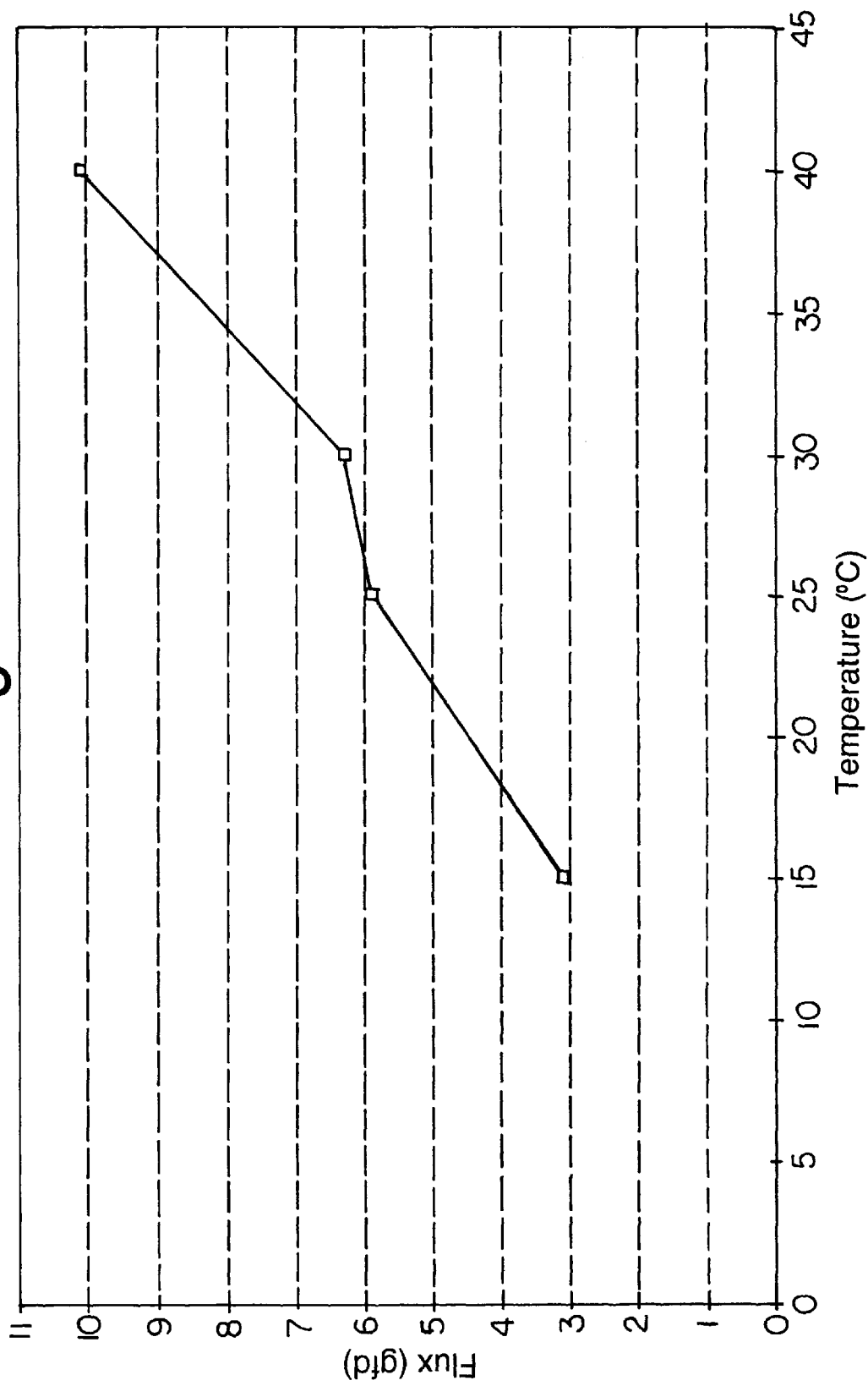
FIG. 6 is a graph showing the flux rate as a function of the condensate temperature.

FIG. 6 illustrates the flux rate as a function of the condensate temperature. Since membrane productivity increases linearly with temperature, the system should be operated at the highest possible temperature to maximize membrane flux, as well as to minimize the cost related to cooling the condensate stream, which when drawn from the evaporator has a temperature of approx. 80° C. Since the maximum allowable operating temperature for the selected reverse osmosis membrane is approx. 45° C., the preferred operating temperature is about 40° C.

Figure 7:
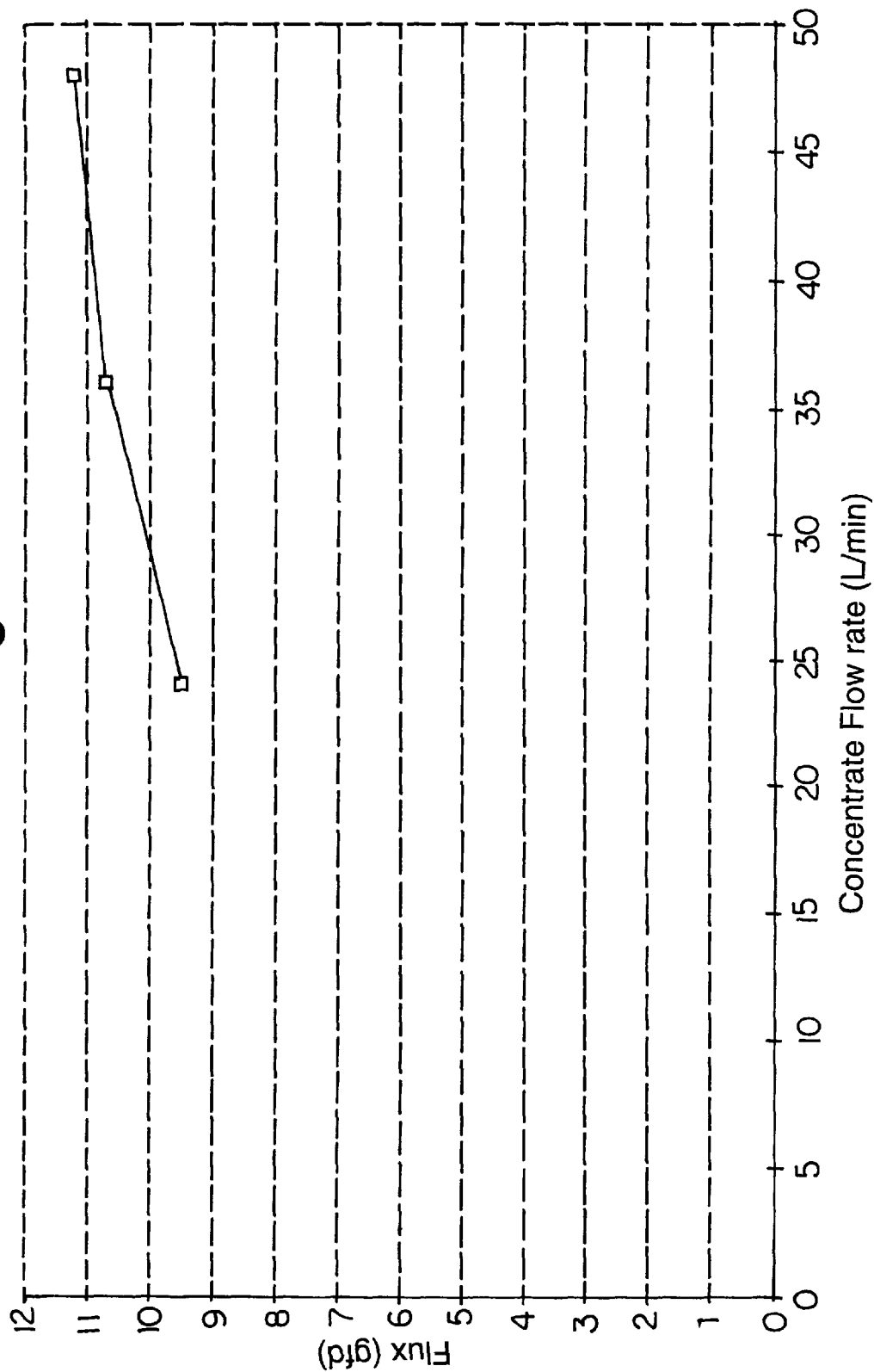
FIG. 7 is a graph showing the flux rate as a function of a concentrate flow rate.

FIG. 7 illustrates the flux rate as a function of the condensate flow rate. It will be seen that the flux rate experiences an increase as the concentrate flow rate increased. The system is accordingly designed to operate at the highest economical and reasonable condensate flow rate. Higher concentrate flow (i.e., less waste concentration) results in a higher cost of evaporation and/or incineration. This is particularly important to membranes that operate at VRs of greater than 90%. The graph of FIG. 7 illustrates a membrane operating at 99% VR. FIGS. 3(a) to 3(e) illustrate various COD rejection rate results achieved in various trials runs, as a function of volume reduction within the waste liquid. In general terms, higher purified water recovery rates will result in higher permeate COD concentrations and consequently lower COD rejection levels. However, use of fifth condensate liquid as the treatment liquid results in relatively high COD rejection rates at all recovery rates.

BOD was also monitored at recovery rates higher than 97%. The weighted average fifth condensate BOD, permeate BOD and BOD rejection rates were 418 mg./L; 75 mg./L and 82% respectively.

FIGS. 3(a)–(e) illustrate trial runs within a pilot plant. These graphs illustrate COD within the feed stream and the permeate, as well as COD removal, as a function of volume reduction. It will be seen that although COD rejection declined at higher recovery levels, the average COD rejection (i.e. the COD reduction achieved by the process and apparatus) remained relatively high at between 72.4% and 90.8% within all trial runs (with 3 and 4 runs producing in excess of 80% rejection). The COD rejection achieved when the process is used with condensate No. 5 is relatively high in comparison with other condensates.

Although the above analysis was conducted on COD removal levels, similar results are achieved with respect to removal of BOD substances comprised of various organic compounds including ethanol, acetone, TRS and other higher molecular weight compounds.

In a further aspect of the preferred embodiment, the RO membranes are washed at selected periodic intervals with standard membrane cleaners such as MC-4 (™)' an alkaline surfactant cleaner by Zenon (™). The cleaning is performed at approx. 40° C., and with a solution at a pH of 11.

The membranes used in the examples were formed of polyamide.

Although the present invention has been described by way of a preferred embodiment thereof, it will be understood by persons skilled in the art to which this invention relates that numerous variations of and departures from this embodiment may be made without departing from the spirit and scope of the invention, as defined within the claims.

We claim:

1. A method of treating condensate resulting from a pulp mill operation to obtain a first stream containing reduced contaminant levels capable of recycle and a second stream containing concentrated contaminant levels capable of being incinerated, comprising:

providing a source of liquid condensate containing contaminants from a pulp operation;

cooling said condensate to a maximum temperature of 45° C.;

adjusting the pH of said condensate to about 9.5–10.4;

passing said liquid condensate through a first reverse osmosis membrane to separate said condensate into first and second liquid streams, said first stream containing concentrated contaminants and the second stream containing reduced contaminant levels;

recycling said second liquid stream within said pulp mill;

passing said first liquid stream through a second reverse osmosis membrane to separate said first liquid stream into third and fourth liquid streams, said third liquid stream containing final stage concentrated contaminants capable of being incinerated and said fourth liquid stream containing reduced contaminant levels; and recycling said fourth liquid stream within said pulp mill.

2. A method as defined in claim 1, wherein said first stage separation is carried out using a membrane for reduction of said contaminants by at least 80% thereby providing a second liquid stream containing less than 20% of the original contaminants of the original liquid condensate.

3. A method as in claim 1, wherein said third liquid stream contains 2% or less of the volume of the original liquid condensate.

4. A method as defined in claim 1, wherein said liquid condensate is contaminated with primarily higher molecular weight organic compounds.

5. A method as defined in claim 1, comprising the additional step of passing said liquid condensate through at least one filter prior to said first separation stage.

6. A method as in claim 1, wherein said first separation stage comprises dividing said liquid condensate into at least two streams and passing said at least two streams through reverse osmosis membranes arranged in parallel.

7. A method as in claim 1, wherein said step of passing said liquid condensate through said reverse osmosis membranes is carried out at a pressure of greater than 300 psig.

8. A method as in claim 1, wherein each said liquid steam containing reduced contaminants is recycled within the Fiberline portion of said pulp mill operation.

9. A method as in claim 8, wherein said step of recycling said liquid stream containing reduced contaminants includes reusing said treated condensate in the Fibrelines including post $O_2$ washing and displacement of hot water in the bleach plant.

10. A method as in claim 1, wherein said step of reducing said heat comprises passing said condensate through a heat exchanger, the heat exchange medium of said heat exchanger comprising at least in part said second and fourth liquid streams.

11. A method as in claim 1, comprising the further step of cleaning said reverse osmosis membranes on a periodic basis, said cleaning step comprising treatment of said membranes with a caustic detergent solution.

12. A method as in claim 1, wherein said first step separation stage comprises removing higher molecular weight organic compounds by said membrane to reduce the amounts of higher molecular weight organic compounds within said condensate by at least approx. 80%.

13. A method as defined in claim 1, wherein said step of cooling said condensate comprises cooling to a maximum temperature of approximately 40° C.

14. A method as defined in claim 1, wherein said step of adjusting the ph, comprises adjusting the ph to approximately 10.0.

15. An apparatus for treating condensate from a pulp Mill operation to obtain a first stream containing reduced contaminant levels and a second stream containing concentrated contaminant levels capable of being incinerated, comprising:

intake means for intake of liquid condensate containing contaminants from a pulp mill operation;

pump means for pumping said liquid condensate through said apparatus;

cooling means to cool said condensate to a maximum of 45° C.;

first and second stage reverse osmosis units, each unit comprising a plurality housings, at least one reverse osmosis membrane within each said housing, said membrane having first and second sides, an inlet for admission of said liquid condensate into said housing for contact with said first side, said reverse osmosis membrane having a structure for substantially preventing the passage of higher molecular weight organic compounds therethrough, while permitting the passage of substantially purified water from said first side through said membrane to said second side;

first and second outlets from said housing for the exit of purified liquid and concentrated waste liquid, respectively, piping communicating between said first and second reverse osmosis units whereby concentrated waste bearing liquid from said first unit is piped to said second unit for additional concentration of said wastes; and pump means to circulate said treated condensate to said pulp mill operation.

16. Apparatus as in claim 15, comprising a third reverse osmosis unit for separation of said condensate in parallel with said first unit; and a line splitter dividing the liquid stream into two streams for parallel treatment within said first and third units.

17. Apparatus as in claim 15, further comprising at least one filter for filtration of said condensate prior to passage of said condensate through said reverse osmosis unit.

18. Apparatus as in claim 17, comprising a second filter positioned between said first and second reverse osmosis units.

19. Apparatus as in claim 15, wherein said cooling means comprises a heat exchanger communicating with said intake means for reducing the temperature of said condensate to a maximum of 45° C. prior to passage through said first reverse osmosis unit, said heat exchanger having an inlet for a heat exchange medium, said inlet communicating with said outlet from said reverse osmosis units.

20. Apparatus as in claim 19, further comprising a second heat exchanger arranged in serial with said first heat exchanger, said second heat exchanger having an inlet and outlet for passage therethrough of a heat exchange medium.

21. An apparatus as defined in claim 19, wherein said beat exchanger is for reducing the temperature of said condensate to a maximum of approximately 40° C.

22. Apparatus as in claim 15, further comprising control means, to maintain a pressure within said reverse osmosis unit of between 300 and 800 PSIG.

* * * * *